United States Patent
Ramanathan et al.

(10) Patent No.: US 11,580,833 B2
(45) Date of Patent: Feb. 14, 2023

(54) CAMERA DETECTION OF HUMAN ACTIVITY WITH CO-OCCURRENCE

(71) Applicant: ObjectVideo Labs, LLC, Tysons, VA (US)

(72) Inventors: Narayanan Ramanathan, Chantilly, VA (US); Allison Beach, Leesburg, VA (US); Gang Qian, McLean, VA (US); Donald Gerard Madden, Columbia, MD (US)

(73) Assignee: Object Video Labs, LLC, Tysons, VA (US)

( * ) Notice: Subject to any disclaimer, the term of this patent is extended or adjusted under 35 U.S.C. 154(b) by 39 days.

(21) Appl. No.: 17/202,528

(22) Filed: Mar. 16, 2021

(65) Prior Publication Data

US 2021/0304574 A1    Sep. 30, 2021

Related U.S. Application Data

(60) Provisional application No. 62/993,997, filed on Mar. 24, 2020.

(51) Int. Cl.
*G08B 13/196* (2006.01)
*H04N 7/18* (2006.01)
*H04N 5/232* (2006.01)

(52) U.S. Cl.
CPC . *G08B 13/19602* (2013.01); *G08B 13/19626* (2013.01); *H04N 5/23251* (2013.01); *H04N 7/181* (2013.01)

(58) Field of Classification Search
CPC ........ G08B 13/19602; G08B 13/19626; G08B 13/196; G08B 13/19617; H04N 5/23251; H04N 7/181; H04N 5/23206; H04N 5/23229; H04N 7/183; H04N 5/23219; H04N 5/23241; H04N 5/2351
See application file for complete search history.

(56) References Cited

U.S. PATENT DOCUMENTS

| | | |
|---|---|---|
| 8,761,436 B2 * | 6/2014 | Ebling ............... G06V 20/53 382/103 |
| 9,082,018 B1 | 7/2015 | Laska et al. |
| 9,193,075 B1 | 11/2015 | Cipollini et al. |
| 9,449,229 B1 | 9/2016 | Laska et al. |
| 10,339,595 B2 | 7/2019 | Glaser et al. |

(Continued)

*Primary Examiner* — Richard A Hansell, Jr.
(74) *Attorney, Agent, or Firm* — Fish & Richardson P.C.

(57) ABSTRACT

Methods, systems, and apparatus for camera detection of human activity with co-occurrence are disclosed. A method includes detecting a person in an image captured by a camera; in response to detecting the person in the image, determining optical flow in portions of a first set of images; determining that particular portions of the first set of images satisfy optical flow criteria; in response to determining that the particular portions of the first set of images satisfy optical flow criteria, classifying the particular portions of the first set of images as indicative of human activity; receiving a second set of images captured by the camera after the first set of images; and determining that the second set of images likely shows human activity based on analyzing portions of the second set of images that correspond to the particular portions of the first set of images classified as indicative of human activity.

19 Claims, 4 Drawing Sheets

(56) References Cited

U.S. PATENT DOCUMENTS

| | | | |
|---|---|---|---|
| 2010/0027844 A1* | 2/2010 | Akita | G06T 7/269 382/103 |
| 2010/0277572 A1* | 11/2010 | Nakamura | G06T 7/75 348/E13.074 |
| 2012/0235805 A1* | 9/2012 | Nogami | G06T 7/215 340/441 |
| 2016/0163064 A1* | 6/2016 | Ruf | G06V 10/24 382/103 |
| 2016/0267325 A1* | 9/2016 | Sundaresan | G06V 10/40 |
| 2019/0035047 A1* | 1/2019 | Lim | H04N 5/23212 |
| 2019/0171871 A1* | 6/2019 | Zhang | G06T 7/75 |
| 2020/0314356 A1* | 10/2020 | Storer | G06T 7/194 |

\* cited by examiner

CAMERA DETECTION OF HUMAN ACTIVITY WITH CO-OCCURRENCE

CROSS-REFERENCE TO RELATED APPLICATION

This application claims the benefit of U.S. Application No. 62/993,997, filed Mar. 24, 2020, which is incorporated by reference in its entirety.

TECHNICAL FIELD

This disclosure application relates generally to surveillance cameras.

BACKGROUND

Many properties are equipped with monitoring systems that include sensors and connected system components. Some residential-based monitoring systems include cameras.

SUMMARY

Techniques are described for camera detection of human activity with co-occurrence.

Many residents and homeowners equip their properties with monitoring systems to enhance the security, safety, or convenience of their properties. A property monitoring system can include cameras that can obtain visual images of scenes at the property. In some examples, a camera can be incorporated into another component of the property monitoring system, e.g., a doorbell camera.

A camera can detect objects of interest and track object movement within a field of view. Objects of interest can include, for example, humans, vehicles, and animals. Objects of interest may be moving or stationary. Certain movements and positions of objects can be considered an event. For example, an event can include an object crossing a virtual line crossing within a camera scene. An event can also include an object loitering in an area for a particular amount of time, or an object passing through an area a particular number of times.

In some examples, events detected by a camera can trigger a property monitoring system to perform one or more actions. For example, detections of events that meet pre-programmed criteria may trigger the property monitoring system to send a notification to a resident of the property or to adjust a setting of the property monitoring system. It is desirable that a camera quickly and accurately detects and classifies events in order to send timely notifications to the resident.

The resident of the property may primarily be concerned with camera motion events that indicate activities of people at the property. For example, the resident may be interested in receiving alerts and notifications related to events that include people approaching the property, departing from the property, delivering packages to the property, retrieving packages from the property, etc. In contrast, the resident may be less concerned with other motion events that may be captured by the camera, such as moving foliage, vehicles, and animals.

In some cases, human activity may occur within a camera's field of view, though the camera may not be able to detect the human. For example, the human may be too far away from the camera, or too close to the camera, for the camera to be able to detect the human. In some examples, the human may be occluded from the camera, such that some or all of the human is not visible to the camera. In some examples, illumination levels and/or light contrast may be insufficient for the camera to detect the human.

In some examples, a camera may be able to detect a human based on detecting co-occurring motion of scene entities and events that typically co-occur with human activity. The co-occurring motion patterns can be inferred for a particular scene based on prior instances of detecting humans. For example, a camera in an apartment lobby may capture images of a scene that includes a sliding door. An area outside of the sliding door may be too darkly illuminated for the camera to perform human detection. The camera may detect motion of the sliding door. Based on prior instances of detecting humans co-occurring with sliding door motion, and in response to detecting motion of the sliding door, the camera can determine that a human is likely beginning to enter the lobby through the sliding door. Thus, the camera can determine that the human is present, though the camera might not be able to detect the human.

In some examples, a camera may be able to detect a human based on detecting motion in portions of an image that correspond to common human motion trajectories. For example, a doorbell camera may capture images of a scene that includes an outdoor staircase. A top step of the staircase may be too far from the camera for the camera to perform human detection. The camera may detect motion in portions of the scene that correspond with the top step of the staircase. In response to detecting motion corresponding with the top step, the camera may determine that a human is likely beginning to descend the staircase. Thus, the camera can determine that the human is present in the scene, though the camera might not be able to detect the human.

Camera detection of human activity with co-occurrence can improve video detection accuracy and speed. In some examples, such as when a person is occluded from the camera, the camera may be able to detect human activity using co-occurrence that would otherwise not be detected by the camera. In some examples, such as when the human is a far distance from the camera, the camera may be able to detect human activity using co-occurrence earlier than would be possible using a human detector.

Camera detection of human activity with co-occurrence can reduce power consumption by the camera. In some examples, a camera may be able to skip processing by a human detector or turn off the human detector. In some examples, the camera may be able to perform human detection using co-occurrence, even if the camera does not include a human detector. Skipping or omitting processing by a human detector can reduce power consumption, as well as processing time.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
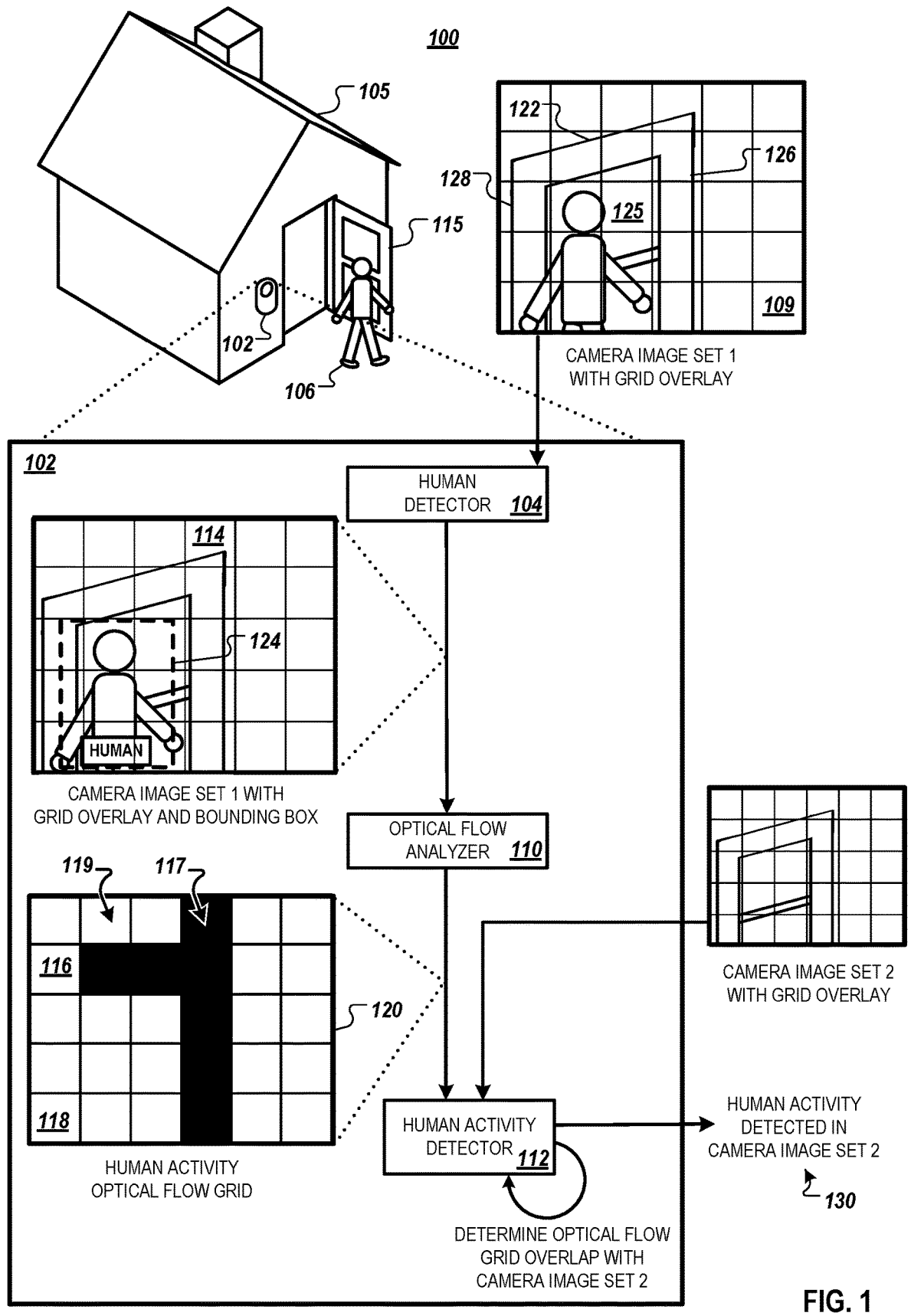
FIG. 1 illustrates an example system for camera detection of human activity with co-occurrence using a camera.

FIG. 1 illustrates an example system 100 for camera detection of human activity with co-occurrence. The system 100 includes a camera 102 with a human detector 104, an optical flow analyzer 110, and a human activity detector 112. The human detector 104 and the optical flow analyzer 110 can train the human activity detector 112 to identify human activity based on detecting motion in selected grid segments of image frames that correspond to movement of inanimate objects. The camera 102 can then detect human activity in camera images even without running the human detector 104 on the camera images.

In FIG. 1, a camera 102 is installed at a property 105. The property 105 can be a home, another residence, a place of business, a public space, or another facility that has one or more cameras 102 installed. The camera 102 is a component of a doorbell that is installed external to the property 105. The doorbell is installed near a door 115 of the property 105. In some examples, the doorbell is a component of a property monitoring system that collects data from various sensors to monitor conditions and events at the property 105.

In addition to the camera 102, the doorbell may include other components and sensors. For example, the doorbell may include a button that, when depressed, causes an audible tone to sound at the property 105. The doorbell may also include additional sensors, e.g., a motion sensor, temperature sensor, light sensor, or a microphone.

The camera 102 captures video from a scene within a field of view. The video includes multiple sequential images, or frames. The camera 102 may have a frame rate, for example, of one frame per second (fps), five fps, or ten fps. The video can include any type of images. For example, the video can include visual light images, infrared images, or radio wave images. In some examples, the video can include a combination of one or more types of images, e.g., visual light images with infrared illumination.

In some examples, the camera 102 can capture video continuously. In some examples, the camera 102 can capture video when triggered by an event. For example, the camera 102 may capture video when triggered by depression of the button on the doorbell, e.g., a human ringing the doorbell. In some examples, the camera 102 may capture video when triggered by activation of the motion sensor or other sensor of the doorbell.

The camera 102 may capture video for a preprogrammed amount of time. For example, when triggered by depression of the button on the doorbell, the camera 102 may capture video for a preprogrammed time of 10 seconds, 30 seconds, or 60 seconds. When triggered by a motion sensor, the camera 102 may capture video for a preprogrammed time and/or may capture video until the motion sensor no longer detects motion.

The camera 102 can perform video analysis on captured video. Video analysis can include detecting, identifying, and tracking objects in the video. The camera 102 includes a human detector 104 that can detect the presence of humans within a frame. When the human detector 104 detects a human, the human detector 104 can identify a bounding box around the image of the human in the frame.

In the example of FIG. 1, a person 106 departs the property 105 by opening the door 115, walking through the doorway, and shutting the door 115. The door 115 swings outward from a door frame, such that when the door 115 opens, the door 115 is visible within the field of view of the camera 102. Due to close proximity between the door 115 and the camera 102, only part of the door 115, e.g., an upper part, is visible within the field of view. Similarly, due to close proximity between the person 106 and the camera 102, when the person 106 departs the property 105, only parts of the person 106, e.g., a torso, head, and arms of the person 106, are visible within the field of view.

In some examples, parts of an object might not be visible to the camera 102 due to occlusion by another object. For example, some parts of the door 115 are not visible to the camera 102 due to occlusion by the person 106. In some examples, an object might not be visible to the camera 102 due to a size of the object. For example, a child entering or exiting through the door 115 might not be visible to the camera 102 due to a height of the child being below the field of view of the camera 102. In another example, a person attempting to evade camera detection might crouch to a height below the field of view of the camera 102 when opening the door 115.

The camera 102 captures video of the person 106 departing the property 105. The camera 102 may capture the video, for example, upon one or more of being triggered by a motion sensor that detects the motion of the person 106 or as part of a constant capturing of frames. The video can include multiple camera image sets. A camera image set can include multiple consecutive image frames captured over a period of time, e.g., two seconds, three seconds, or five seconds. In some examples, the camera image set can include two seconds of video at a frame rate of five fps, thus including ten image frames. The camera 102 can select one or more camera image sets for human detection analysis.

The video captured by the camera 102 includes Camera Image Set 1. Camera Image Set 1 includes multiple image frames showing the person 106 and the door 115. The multiple image frames may be captured by the camera 102 over a length of time. The length of time may correspond to a length of time that the person 106 is within the field of view. The length of time may be, for example, two seconds, five seconds, or ten seconds. In some examples, the length of time can also include an amount of time before the person 106 enters the field of view and an amount of time after the person 106 exits the field of view.

Camera Image Set 1 can be a camera image set selected for human detection analysis by the camera 102. In some examples, the camera 102 may select the camera image set based on illumination level criteria. To determine if the illumination of a camera image set meets illumination level criteria, the camera 102 can convert red-green-blue (RGB) image data for the camera image to luminance (LUV) data and extract the "L" value. If the median value of L is above a threshold value, e.g., one hundred, the camera 102 can classify the camera image set as "well-illuminated." The camera 102 can then analyze well-illuminated camera image sets to identify human activity and co-occurring events.

Camera Image Set 1 includes a grid overlay. The grid overlay can be applied to camera images of the camera image set. The grid overlay divides each image into multiple grid segments. Each grid segment may be a rectangular or square shape. In some examples, each grid segment can be a square with dimensions of, e.g., eight pixels by eight pixels, ten pixels by ten pixels, or twelve pixels by twelve pixels.

With the grid overlay applied to the camera images, the camera 102 can analyze Camera Image Set 1 by comparing corresponding grid segments of consecutive frames of Camera Image Set 1, to determine optical flow characteristics in each grid segment. For example, the camera 102 can analyze grid segment 109 in consecutive frames of Camera Image Set 1 to determine an average optical flow magnitude and direction in grid segment 109.

The camera 102 can analyze Camera Image Set 1 using the human detector 104. The human detector 104 can be, for example, a pre-trained neural network model human detector. The human detector 104 receives Camera Image Set 1 and identifies the person 106 as a human.

The human detector 104 identifies a bounding box 124 around the human in Camera Image Set 1. The bounding box 124 can be an area of each frame where the human is positioned. The bounding box 124 can coarsely outline the human using, for example, a rectangular shape. In some examples, the bounding box 124 can outline the human using another shape such as a hexagon, pentagon, or ellipse.

The human detector 104 can output camera image sets that include images of humans to the optical flow analyzer 110. Since Camera Image Set 1 includes images of the person 106, and the human detector 104 identified the person 106 as a human, the human detector 104 outputs Camera Image Set 1 with the bounding box 124 to optical flow analyzer 110. The optical flow analyzer 110 can then analyze Camera Image Set 1 to identify grid segments that meet location criteria and optical flow criteria. Grid segments that meet location and optical flow criteria can be classified as having strong flow motion characteristics and can be included in an output human activity optical flow grid 120.

Selected grid segments of the optical flow grid 120, shaded black, represent areas of the camera field of view that have a correlation with human activity. In the example of FIG. 1, the selected grid segments of the optical flow grid 120 correspond generally to portions of an inanimate object, e.g., the door 115, that typically moves in co-occurrence with human motion. In some examples, selected grid segments of an optical flow grid can correspond to human optical flow patterns or trajectories as observed on a ground-plane surface of a scene. An example of an optical flow grid showing human trajectory motion observed on a ground-plane is described in greater detail below with reference to FIG. 2A.

The optical flow analyzer 110 can analyze Camera Image Set 1 to identify and select grid segments that meet location criteria. The location criteria can include a grid segment being outside of the bounding box 124. In some examples, the optical flow analyzer 110 can select grid segments that have no overlap with the bounding box 124. In some examples, the optical flow analyzer 110 can select grid segments that have less than a threshold overlap with the bounding box 124. For example, a threshold bounding box overlap may be thirty percent of a grid segment area.

For example, the optical flow analyzer may determine that an overlap between grid segment 114 and the bounding box 124 is fifteen percent of the area of the grid segment 114. The optical flow analyzer 110 can then determine that the grid segment 114 meets location criteria, since the overlap with the bounding box 124 is less than the threshold overlap. Therefore, the optical flow analyzer 110 can select the grid segment 114 for potential inclusion in the optical flow grid 120, subject to meeting optical flow criteria.

The optical flow analyzer 110 can analyze Camera Image Set 1 to identify and select grid segments that meet optical motion flow magnitude criteria. Grid segments that meet optical motion flow magnitude criteria can be classified as having strong flow magnitude.

The optical flow analyzer 110 can analyze an optical flow magnitude of each grid segment, e.g., a speed of motion flow of each grid segment. To determine a speed of motion flow, the optical flow analyzer 110 can estimate optical flow magnitude for corresponding grid segments in consecutive camera images. Specifically, the optical flow analyzer 110 can compute optical flow on each pixel by comparing corresponding pixels of each image frame of Camera Image Set 1 to a previous image frame. The optical flow analyzer 110 can then compute cumulative or average optical flow magnitude within each grid segment. In some examples, the optical flow analyzer 110 may analyze optical flow magnitude only on grids segments that meet location criteria, as described above.

In general, when the person 106 exits the property 105, the door 115 swings open and shut. The grid segments corresponding to a swinging edge 126 of the door may show a higher optical flow magnitude, while the grid segments corresponding to a hinged edge 128 of the door 115 may show a lower optical flow magnitude. The grid segments corresponding to an upper edge 122 of the door 115 and to a center area 125 of the door 115 may show varying optical flow magnitude, depending on a distance between each grid segment and the hinged edge 128.

The optical flow magnitude criteria can include a grid segment having an average optical flow magnitude above a threshold optical flow magnitude. For example, a threshold optical flow magnitude may be three pixels per frame. The optical flow analyzer 110 may analyze an average optical flow magnitude of grid segment 116, corresponding to the hinged edge 128, and determine that the average optical flow magnitude of the grid segment 116 is one pixel per frame. The optical flow analyzer 110 can then determine that the grid segment 116 does not meet criteria for the optical flow magnitude, since the average optical flow is less than three pixels per frame. Therefore, the optical flow analyzer 110 might not select the grid segment 116 for inclusion in the optical flow grid 120.

The optical flow analyzer 110 can analyze Camera Image Set 1 to identify and select grid segments that meet optical flow direction criteria. Grid segments that meet optical flow direction criteria can be classified as having strong flow coherence. The optical flow analyzer 110 can analyze a direction of motion flow of each grid segment. To determine a direction of motion flow, the optical flow analyzer 110 can sort pixels into two or more categories, or bins, based on flow orientation of each pixel. The bins can correspond to a direction of motion. The direction of motion can be described in reference to a reference direction at zero degrees, e.g., horizontal to the right. A reciprocal of the reference direction is then one hundred-eighty degrees, e.g., horizontal to the left.

In some examples, the optical flow analyzer 110 can sort the pixels into six bins. Each of the six bins can include pixels with flow orientation within a range of thirty degrees, and their reciprocal orientations. For example, a first bin can include pixels with flow orientation between zero and thirty degrees, as well as between one hundred-eighty and two hundred-ten degrees. A second bin can include pixels with flow orientations between thirty and sixty degrees, and between two hundred-ten and two-hundred forty degrees, etc.

The optical flow analyzer 110 can estimate a percentage of pixels within each grid segment that are within the same bin. For example, all pixels within a grid segment might not have optical flow in the same direction. Some of the pixels within a grid segment may have no optical flow, or may have optical flow in various directions. This can occur, for example, if the grid segment includes pixels corresponding to two different objects located near each other, moving in different directions. The optical flow analyzer 110 can determine a number of pixels, or a percentage of pixels, of the grid segment that are moving in unison. In some examples, the optical flow analyzer 110 may analyze optical flow magnitude only on grid segments that meet location criteria, flow magnitude criteria, or both, as described above.

The optical motion flow direction criteria can include a coherence, or uniformity, of motion flow within the grid segment. The optical flow analyzer 110 can select grid segments within which greater than a threshold percentage of pixels move in the same direction, e.g., are in the same bin. For example, a threshold percentage of pixels may be sixty percent of pixels. The optical flow analyzer 110 may analyze a coherence of grid segment 118, corresponding to the hinged edge 128 and to part of the person 106. Pixels within the grid segment 118 corresponding to the hinged edge 128 may be moving in a certain direction, while pixels within the grid segment 118 corresponding to the person 106 may be moving in a different direction. The optical flow analyzer 110 may determine that forty percent of pixels within the grid segment 118 are moving in a direction between zero and thirty degrees, while forty percent of pixels within the grid segment 118 are moving in a direction between one hundred fifty and one hundred eighty degrees. The optical flow analyzer 110 may determine that the remaining twenty percent of pixels within the grid segment 118 are not moving, or have a negligible optical flow magnitude. The optical flow analyzer 110 can then determine that the grid segment 118 does not meet criteria for the percentage of pixels moving in unison, since less than sixty percent of the pixels are moving in any given direction. Therefore, the optical flow analyzer 110 might not select the grid segment 118 for inclusion in the optical flow grid 120.

The optical flow analyzer 110 can analyze Camera Image Set 1 to identify and select grid segments that show coherence with adjacent grid segments. For example, upon analyzing the optical flow magnitude and direction of each grid segment that meets the location criteria, the optical flow analyzer 110 may compare the optical flow of each grid segment with each adjacent grid segment. The optical flow analyzer 110 may reject outlier grid segments, e.g., grid segments that differ from adjacent grid segments in optical flow magnitude, direction, or both. The optical flow analyzer may select coherent grid segments, e.g., grid segments for which a certain number of percentage of adjacent grid segments show similar optical flow characteristics.

In some examples, the optical flow analyzer 110 can generate the optical flow grid 120 based on analyzing multiple camera image sets, e.g., fifteen, twenty, or thirty camera image sets. For example, the optical flow analyzer 110 may analyze multiple camera image sets captured over a period of time, e.g., several days or several weeks. Each camera image set may include an image of a human, as detected by the human detector 104.

The optical flow analyzer 110 can aggregate optical flow data from the multiple camera image sets to generate the optical flow grid 120. In some examples, the optical flow analyzer 110 can generate an optical flow grid for each camera image set. The optical flow analyzer 110 can then select grid segments that meet optical flow grid criteria in a certain number or percentage of camera image sets. For example, the optical flow analyzer 110 may analyze twenty camera image sets. To be selected for inclusion in the optical flow grid 120, a particular grid segment may need to meet optical flow grid criteria in seventy-five percent of the camera image sets, e.g., fifteen out of the twenty camera image sets.

The optical flow analyzer 110 outputs the optical flow grid 120. The optical flow grid 120 includes selected grid segments, e.g., grid segments selected by the optical flow analyzer 110 due to meeting optical flow criteria in multiple camera image sets. In FIG. 1, black grid segments 117 represent the selected grid segments, while white grid segments 119 represent non-selected grid segments.

The selected grid segments of the optical flow grid 120 represent areas of the camera field of view that have a correlation with human activity, based on analysis of motion in multiple camera image sets. The selected grid segments of the optical flow grid 120 correspond generally to portions of the door 115 that are outside of the bounding box 124 and show strong optical flow motion magnitude and coherence of direction.

The optical flow grid 120 indicates that when human activity occurs in the field of view of the camera 102, the grid segments corresponding to the upper edge 122 and the swinging edge 126 typically show strong optical flow motion. In contrast, the grid segments corresponding to the hinged edge 128 do not show strong optical flow motion. Though the grid segments corresponding to a center area 125 of the door may satisfy optical flow motion criteria, the grid segments corresponding to the center area 125 might not meet location criteria due to overlapping with the bounding box 124.

The optical flow grid 120 can be a binary grid as shown in FIG. 1, e.g., each grid segment is either selected or not selected. In some examples, the optical flow grid 120 can include a graded "heat map" instead of, or in addition to, the binary grid. For example, each grid segment can be assigned a human activity correlation grade on a scale. The human activity detector 112 can then weight each grid segment according to its human activity correlation grade.

In some examples, the optical flow analyzer 110 may generate an optical flow grid that includes selected grid segments corresponding to two or more events. For example, a camera field of view may include both an outward swinging door, as shown in FIG. 1, and a gate that allows access to a yard of the property. A human approaching and entering the property may typically open the gate, enter the yard, shut the gate, approach the door, open the door, enter the door, and shut the door. The optical flow analyzer 110 can thus generate an optical flow grid that includes selected grid segments corresponding to events that include both motion of the door and motion of the gate.

The human activity detector 112 receives the optical flow grid 120. The human activity detector 112 can then store the optical flow grid 120. Once the human activity detector 112 stores the optical flow grid 120, the human activity detector 112 may be considered "trained" for human activity detection based on optical flow correlation. Upon receiving additional camera image sets, the human activity detector 112 can use the optical flow grid 120 to infer that certain detected motion in camera image sets is associated with likely human activity.

The camera 102 can continue to capture video. The video can include Camera Image Set 2. Camera Image Set 2 includes multiple image frames showing the door 115. Camera Image Set 2 includes a same or similar grid overlay as Camera Image Set 1.

Since the human activity detector 112 is trained to detect human activity, e.g., is storing the optical flow grid 120, the camera 102 may determine to skip performing human detection analysis with the human detector 104. In some examples, the camera 102 may be programmed to skip human detection analysis once the human activity detector 112 is trained. In some examples, the human detector 104 may be disabled once the human activity detector 112 is trained.

In some examples, skipping human detection analysis or disabling the human detector 104 can enable the camera 102 to consume less electrical power and/or extend battery life. The human activity detector may consume less electrical power than the human detector 104, e.g., due to not running a neural network model. In some examples, skipping human detection analysis can enable the camera 102 to increase processing speed and reduce latency of providing notifications based on detected human activity.

In some examples, the human activity detector 112 can be used as a backup to the human detector 104. In some cases, a human may appear in a camera image set, but the human detector 104 might not detect the human. For example, the human may be moving too quickly for the human detector 104 to detect the human. In another example, the human may be too close in proximity to the camera 102 for the human detector 104 to detect the human. The camera 102 may run both the human detector 104 and the human activity detector 112 on the camera image set. In cases where the human detector 104 fails to detect a human, the human activity detector 112 may still be able to infer human activity based on optical flow of grid segments.

In FIG. 1, the human activity detector 112 receives Camera Image Set 2. The human activity detector 112 can perform optical flow analysis on Camera Image Set 2, as described above with reference to Camera Image Set 1. The human activity detector 112 can determine grid segments of Camera Image Set 2 that show strong optical flow magnitude and coherent optical flow direction. The human activity detector 112 can then determine an overlap between the optical flow grid 120 and Camera Image Set 2. The overlap can include a number of selected grid segments of the optical flow grid 120 that correlate to grid segments of Camera Image Set 2 that show strong optical flow characteristics.

Camera Image Set 2 shows the door 115 opening, but does not show a human. Camera Image Set 2 might not show a human due to, for example, the human's height being shorter than the elevation of the camera's field of view. In another example, Camera Image Set 2 might not show a human due to the human crouching below the field of view of the camera.

The human activity detector 112 compares the optical motion flow of Camera Image Set 2 to the optical flow grid 120. The human activity detector 112 can determine an overlap between Camera Image Set 2 and the optical flow grid 120. The human activity detector 112 may determine that the optical motion flow of Camera Image Set 2 matches the optical flow grid 120, e.g., that each selected grid segment of the optical flow grid 120 also shows strong optical flow characteristics in Camera Image Set 2. In response to determining that the optical motion flow of Camera Image Set 2 matches the optical flow grid 120, the human activity detector 112 can determine that Camera Image Set 2 shows motion that indicates likely human activity, even though no human is visible in Camera Image Set 2.

In some examples, the human activity detector 112 may determine a matching percentage between the motion flow of Camera Image Set 2 and the optical flow grid 120. For example, the human activity detector 112 can determine that eighty percent of grid segments of the optical flow grid 120 also show motion flow in Camera Image Set 2. The human activity detector 112 can then determine that Camera Image Set 2 shows motion that indicates likely human activity based on the matching percentage exceeding a threshold matching percentage. For example, the threshold matching percentage may be seventy-five percent. Based on the matching percentage of eighty percent exceeding the threshold matching percentage of seventy-five percent, the human activity detector 112 may determine that Camera Image Set 2 shows likely human activity.

In response to determining that Camera Image Set 2 shows likely human activity, the human activity detector 112 may provide a human activity detection signal 130. For example, the human activity detector 112 may provide the human activity detection signal 130 to a computer system of the monitoring system, such as a remote server or a control unit. The computer system may then generate a notification to provide to a user of the monitoring system, e.g., via a mobile device. In some examples, in response to determining that Camera Image Set 2 shows likely human activity, the human activity detector 112 may provide a notification directly to the mobile device, e.g., through a network.

In some examples, the camera 102 may receive input from other sensors at the property 105. For example, the camera 102 may receive data from a motion sensor. The motion sensor may be positioned to detect motion near the camera 102. In some examples, the motion sensor may be a component of the camera 102. The human activity detector can correlate optical flow of camera set images with motion sensor data to verify detected human activity. For example, when the person 106 opens the door 115, the motion detector may detect motion of the door. The human activity detector may detect strong optical flow characteristics in grid segments corresponding to door movement. Based on the motion sensor data aligning with the optical flow data, the human activity detector can determine with a greater confidence that human activity is likely occurring.

In some examples, the optical flow analyzer 110 can update the optical flow grid 120 over time. For example, the camera 102 may periodically run the human detector 104 to detect for humans in a new camera image set. The optical flow analyzer 110 can generate an optical flow grid based on the new camera image set. The optical flow analyzer 110 can compare the optical flow grid for the new camera image set to the optical flow grid 120 stored by the human activity detector 112. The optical flow analyzer 110 may then adjust the optical flow grid 120 stored by the human activity detector 112 based on the optical flow grid for the new camera image set.

The camera 102 may be programmed to run the human detector 104 periodically, e.g., once per hour, once per week, or once per month. In some examples, the camera 102 may run the human detector 104 in response to an event. For example, the camera 102 may run the human detector 104 in response to receiving feedback. The camera 102 may receive feedback, for example, from a user providing feedback to the camera 102, e.g., through a user interface provided on a mobile device. The user may provide feedback for individual camera events. For example, the human activity detector 112 may detect human activity, and the camera 102 may send a notification of the human activity to the user, e.g., via the mobile device. The user may then provide feedback that the notification was received too late, or that the notification was inaccurate. In response to receiving the feedback, the camera 102 may determine to run the human detector 104 in order to verify and/or update the optical flow grid 120.

For example, a position of the camera 102 may change so that the door 115 occupies different grid segments when the door 115 swings open. The camera 102 may capture a new camera image set that shows a human exiting the property 105 through the door 115. The optical flow analyzer 110 may determine that the optical flow grid for the new camera image set does not match the optical flow grid 120 stored by the human activity detector. The optical flow analyzer 110 may then analyze multiple camera image sets to determine a new optical flow grid, and provide the new optical flow grid to the human activity detector 112. The human activity detector 112 can then store the new optical flow grid, and use the new optical flow grid to detect for human activity in subsequent camera image sets.

Though described above as being performed by a particular component of system 100 (e.g., the camera 102), any of the various control, processing, and analysis operations can be performed by either the camera 102 or another computer system of the system 100. For example, the human detector 104, the optical flow analyzer 110, or both, may be incorporated into a computer system that can communicate with the camera 102, e.g., over a network. The computer system may be, for example, a control unit or a remote server of a monitoring system. The control unit, the remote server, the camera 102, or another computer system can analyze the images captured by the camera to detect humans and generate bounding boxes. Similarly, the control unit, the remote server, the camera 102, or another computer system can perform optical flow analysis, generate an optical flow grid, and/or detect for human activity based on camera image overlap with the optical flow grid.

In some examples, the camera 102 may include the human activity detector 112 and might not include the human detector 104. The camera 102 may undergo a training phase, e.g., upon installation at the property 105, during which the camera 102 can collect camera images and send the camera images to a computer system with a human detector. The computer system can then perform human detection, optical flow analysis, or both, as described above. The computer system can provide the optical flow grid 120 to the camera 102. The human activity detector 112 of the camera 102 can then detect human activity in captured images based on overlap with the optical flow grid 120, even without having a human detector 104.

In some examples, in addition to or instead of detecting human activity based on motion overlap with optical flow grids, a camera may be able to detect human activity based on overlap with trajectory grids for human detection events. Processes for generating trajectory grids and using trajectory grids to detect human activity are described below with reference to FIGS. 2A and 2B.

Figure 2:
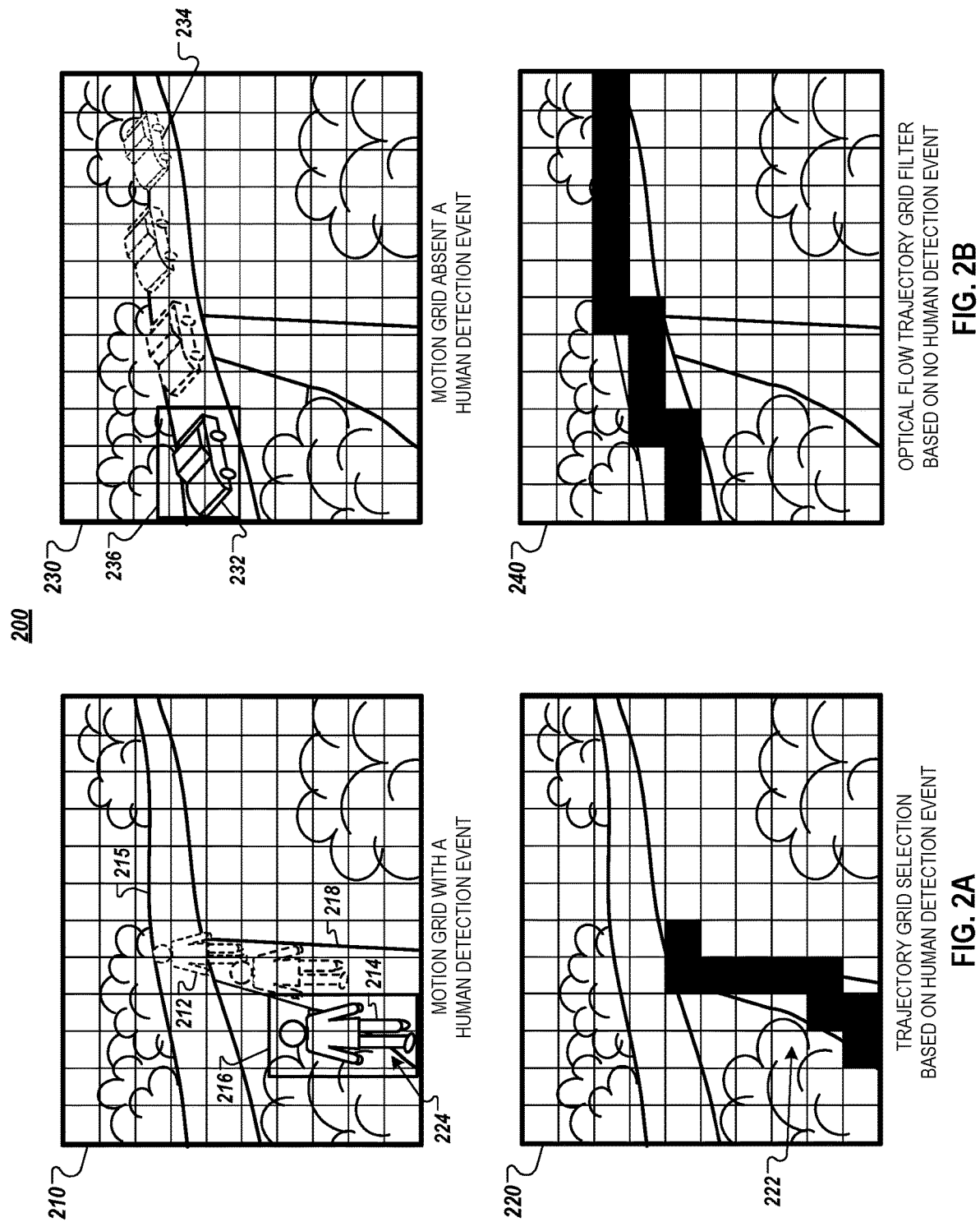
FIGS. 2A and 2B illustrate example motion grids and trajectory grids for a human detection event and a non-human detection event, respectively.

FIGS. 2A and 2B illustrate example motion grids and trajectory grids for a human detection event and a non-human detection event, respectively. FIG. 2A shows a motion grid 210 corresponding with a human detection event, and a corresponding human trajectory grid 220. FIG. 2B shows a motion grid 230 not corresponding with a human detection event, and a corresponding non-human trajectory grid 240.

A human detection event can include a human detection by a sensor other than the camera. For example, a human detection event can include a human detection by a doorbell, a motion sensor, or a microphone. When a human detection event occurs, the camera can perform analysis to determine motion grids and trajectory grids corresponding with the human detection event, e.g., motion grids and trajectory grids for motion that occurred within the camera field of view prior to, during, and/or following the human detection event.

A camera can capture camera image sets and perform object detection tracking on the camera image sets. Based on the object detection and tracking, the camera can determine common trajectories, or motion paths, of humans and non-humans. The camera can be trained to identify human activity based on detecting motion in selected grid segments of image frames that correspond to the common trajectories. The camera can then detect human activity in camera images even without running a human detector on the camera images.

The camera capturing the images of FIGS. 2A and 2B can be, for example, the camera 102 including the human detector 104, the optical flow analyzer 110, and the human activity detector 112. In some examples, the camera includes an object detector in addition to, or instead of, the human detector. The object detector may detect moving objects within image frames, and might not distinguish between human objects and non-human objects.

The motion grid 210 of FIG. 2A shows a changing position of a human over time in a camera image set. The camera image set can be a camera image set selected for human detection analysis by the camera 102. In some examples, the camera 102 may select the camera image set based on illumination level criteria. In the camera image set, the images show the human walking toward the camera 102 on a walkway 218 extending to the camera 102 from a street 215. The position of the human in the final image frame of the camera image set is represented by a solid human outline 214. The positions of the human in earlier image frames are represented by dashed human outlines, e.g., the dashed human outline 212.

The motion grid 210 of FIG. 2A is divided into multiple grid segments. The camera 102 can analyze the camera image set by comparing the corresponding grid segments of consecutive frames to determine optical flow characteristics in each grid segment. The camera 102 can also analyze the camera image set using the object detector. The object detector can identify the human as a moving object and can identify a bounding box 216 around the moving object. The object detector can output the camera image set with the bounding box 216 to the optical flow analyzer 110.

The optical flow analyzer 110 can analyze the camera image set to identify and select grid segments that meet optical flow criteria. The optical flow criteria can include, for example, optical flow magnitude criteria and direction criteria as described above. The optical flow analyzer 110 can generate the trajectory grid 220 based on analyzing multiple camera image sets.

The trajectory grid 220 includes selected grid segments, e.g., grid segments selected by the optical flow analyzer 110 due to meeting optical flow criteria in multiple camera image sets. In FIGS. 2A and 2B, the selected grid segments are shaded black, while non-selected grid segments are shaded white.

The camera 102 may be programmed to run the object detector periodically, e.g., once per hour, once per week, or once per month. In some examples, the camera 102 may run the object detector in response to an event. For example, the camera 102 may run the object detector in response to a human detection event in which a human is detected by a component of a monitoring system.

For example, the camera 102 may be integrated into a doorbell. A human may approach the camera 102 and ring the doorbell. In response to the human ringing the doorbell, the camera 102 may run the object detector on images captured by the camera during a time prior to the human ringing the doorbell, e.g., within ten seconds before the human ringing the doorbell. The optical flow analyzer may then analyze the motion grid output from the human detector to generate a trajectory grid based on motion detected during the time leading up to the human ringing the doorbell.

The camera 102 can repeat the process of running the object detector on images captured by the camera prior to other human detection events. The human activity detector 112 can then generate the trajectory grid 220 by aggregating multiple trajectory grids for times leading up to multiple human detection events. The human activity detector 112 can then store the trajectory grid 220.

The selected grid segments of the trajectory grid 220 represent areas of the camera field of view that have a correlation with human activity, based on analysis of motion in multiple camera image sets. The selected grid segments of the trajectory grid 220 correspond generally to the walkway 218.

In some examples, to generate the trajectory grid 220, the optical flow analyzer 110 may assume the camera 102 is installed upright with a negligible tilt angle. The optical flow analyzer 110 can then select bottom-most grid segments that overlap with the bounding box in each image of the camera image set. By selecting the bottom-most grid segments of the bounding boxes, the optical flow analyzer 110 can select the grid segments that most likely correspond movement along a ground-plane surface of the images. Movement along a ground-plane surface can include human feet walking on a ground plane surface such as the walkway 218.

For example, grid segment 222 may show strong optical flow in the motion grid 210 due to movement of the human's torso. However, the grid segment 222 is not a bottom-most grid segment that overlaps with the bounding box 216. Therefore, the optical flow analyzer 110 might not select the grid segment 222 for inclusion in the trajectory grid 220. In contrast, grid segment 224 may show strong optical flow in the motion grid 210 due to movement of the human's feet. The grid segment 224 is a bottom-most grid segment that overlaps with the bounding box 216. Therefore, the optical flow analyzer 110 may select the grid segment 224 for inclusion in the trajectory grid 220.

The trajectory grid 220 indicates that when human activity occurs in the field of view of the camera 102, the grid segments corresponding to the walkway 218 typically show strong optical flow characteristics. In contrast, the grid segments corresponding to the street 215 do not show strong optical flow motion.

The human activity detector 112 receives the trajectory grid 220. The human activity detector 112 can then store the trajectory grid 220. Once the human activity detector 112 stores the trajectory grid 220, the human activity detector 112 may be considered "trained" for human activity detection based on trajectory motion. Upon receiving additional camera image sets, the human activity detector 112 can use the trajectory grid 220 to infer that certain detected motion trajectories in camera image sets are associated with likely human activity.

In some examples, the human activity detector 112 can store a sequence of grid segments of the trajectory grid 220. For example, human trajectories may typically begin with activity in grid segments corresponding to an intersection between the walkway 218 and the street 215. Human trajectories may then typically proceed along the walkway 218 toward the camera.

The human activity detector 112 can compare the optical motion flow of a camera image set to the trajectory grid 220. The human activity detector 112 can determine an overlap between the camera image set and the trajectory grid 220. The human activity detector 112 may determine that grid segments showing strong optical flow characteristics in the camera image set overlap with one or more grid segments of the trajectory grid 220. In response to determining that the optical motion flow of the camera image set matches the trajectory grid 220, the human activity detector 112 can determine that the camera image set shows motion that indicates likely human activity.

In some examples, the human activity detector 112 may determine that a camera image set shows strong optical flow in grid segments that correspond with a beginning of a typical trajectory. For example, the human activity detector 112 may determine that the camera image set shows strong optical flow in grid segments corresponding with a beginning of a typical trajectory such as the intersection between the street 215 and the walkway 218. In response to determining that the camera image set shows strong optical flow in grid segments that correspond with the beginning of a typical trajectory, the human activity detector 112 may predict that a human detection event will occur.

The camera 102 may be able to detect motion in a series of images at a greater distance than the camera 102 can perform object recognition. Thus, the human activity detector 112 may enable the camera 102 to identify a human detection event earlier than can be detected by an object detector or a human detector. For example, the human activity detector 112 may be able to detect motion at a distance corresponding to the intersection between the walkway 218 and the street 215. In contrast, a human detector might only be able to detect objects at a distance corresponding to a middle of the walkway 218, e.g., mid-way between the street 215 and the camera 102. Thus, for an event including a human approaching the camera 102, the human activity detector 112 may be able to detect the human earlier than the human detector 104.

In some examples, the optical flow analyzer 110 can update the trajectory grid 220 over time. For example, the camera 102 may periodically run the object detector to detect for humans in a new camera image set. The optical flow analyzer 110 can generate a trajectory grid based on the new camera image set. The optical flow analyzer 110 can compare the trajectory grid for the new camera image set to the trajectory grid 220 stored by the human activity detector 112. The optical flow analyzer 110 may then adjust the trajectory grid 220 stored by the human activity detector 112 based on the trajectory grid 220 for the new camera image set.

The motion grid 230 of FIG. 2B shows a changing position of a vehicle over time in a camera image set. In the camera image set, the images show the vehicle driving from a right side to a left side along the street 215. The position of the vehicle in the final image frame of the camera image set is represented by a solid vehicle outline 232. The positions of the vehicle in earlier image frames are represented by dashed vehicle outlines, e.g., the dashed vehicle outline 234.

The camera 102 can analyze the camera image set using the object detector. The object detector can identify the vehicle as a moving object and can identify a bounding box 236 around the moving object. The object detector can output the camera image set with the bounding box 236 to the optical flow analyzer 110.

The optical flow analyzer can generate the trajectory grid 240 by selecting grid segments that meet optical flow criteria in multiple camera image sets. The selected grid segments of the trajectory grid 240 represent areas of the camera field of view that have a correlation with object activity, based on analysis of motion in multiple camera image sets. The selected grid segments of the trajectory grid 240 correspond generally to the street 215.

Though the selected grid segments of the trajectory grid 240 show strong optical flow when vehicles drive on the street 215, the selected grid segments of the trajectory grid 240 do not generally correspond with a human detection event. Thus, the trajectory grid 240 indicates that when the grid segments corresponding to the street 215 show strong optical flow characteristics, human activity typically does not occur. The human activity detector 112 can therefore use the trajectory grid 240 as a filter for human activity. For example, when camera image sets show strong optical flow in grid segments corresponding to the trajectory grid 240, the human activity detector 112 can determine that the camera image does not likely indicate human activity.

Figure 3:
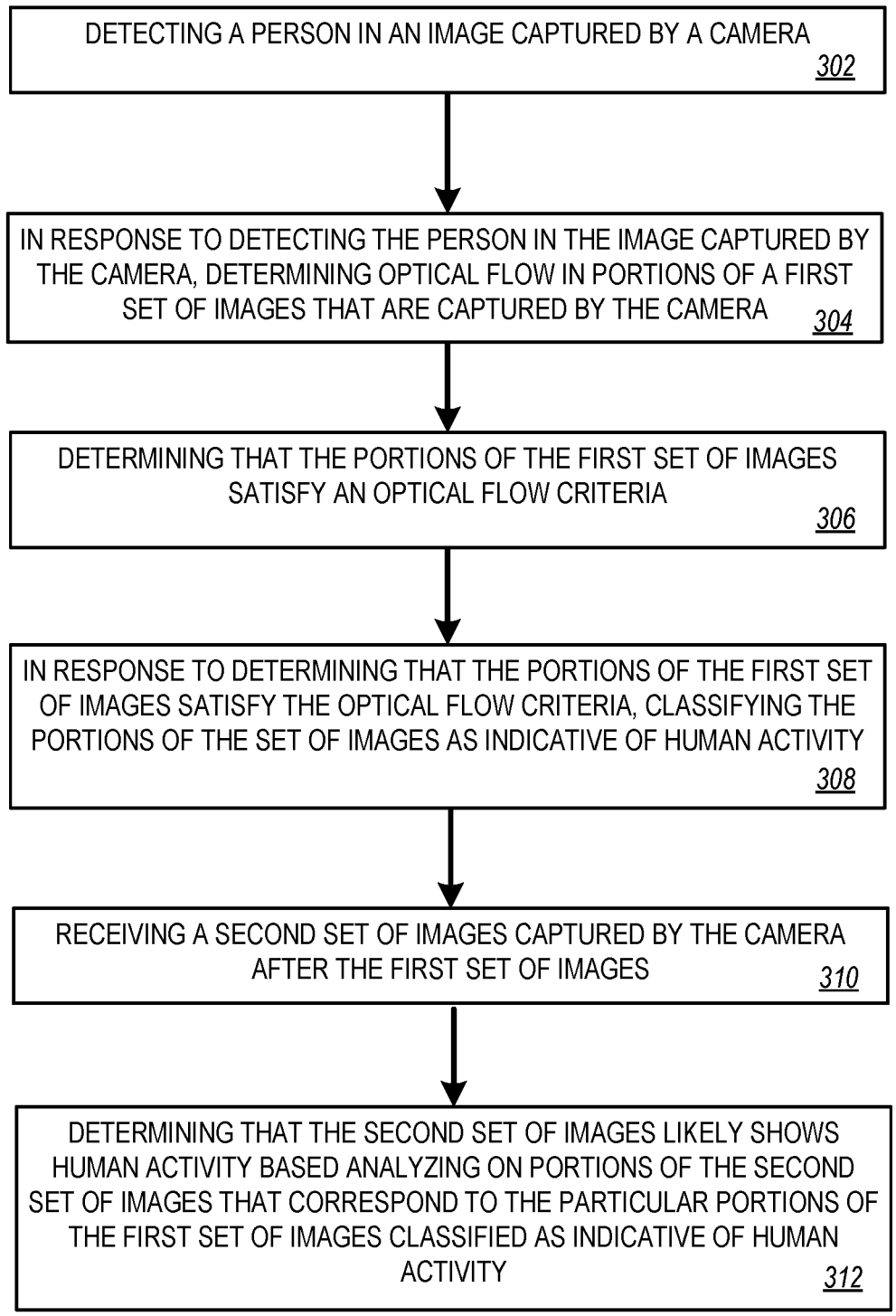
FIG. 3 is a flow chart illustrating an example of a process for camera detection of human activity with co-occurrence.

FIG. 3 is a flow chart illustrating an example of a process 300 for camera detection of human activity with co-occurrence. The process 300 can be performed by a camera, e.g. the camera 102. In some implementations, the process 300 can be performed by one or more computer systems that communicate electronically with a camera, e.g., over a network.

Briefly, process 300 includes detecting a person in an image captured by a camera (302), determining optical flow in portions of a first set of images that are captured by the camera (304), determining that the portions of the first set of images satisfy optical flow criteria (306), classifying the portions of the first set of images as indicative of human activity (308), receiving a second set of images captured by the camera after the first set of images (310), and determining that the second set of images likely shows human activity based on analyzing portions of the second set of images that correspond to the particular portions of the first set of images classified as indicative of human activity (312).

In additional detail, the process 300 includes detecting a person in an image captured by a camera (302). For example, the camera 102 can detect the person 106 in an image, using the human detector 104. The image may be a single image frame of a set of images. The image may show background objects in addition to the person 106. For example, the image may show gates, walkways, street, and doors, e.g., the door 115.

The process 300 includes in response to detecting the person in the image captured by the camera, determining optical flow in portions of a first set of images that are captured by the camera (304). For example, the optical flow analyzer 110 can determine optical flow in portions of Camera Image Set 1. In some implementations, the first set of images may include consecutive images that begin with the frame in which a human was detected. For example, upon detecting the person in the image frame, the human detector 104 may send the image frame, and multiple consecutive image frames captured by the camera 102 after the image frame, to the optical flow analyzer 110 for determining optical flow. In some implementations, the first set of images may include consecutive images that end with the frame in which a human was detected. For example, upon detecting the person in the image frame, the human detector 104 may send the image frame, and multiple consecutive image frames captured by the camera 102 prior to the image frame, to the optical flow analyzer 110 for determining optical flow. In some implementations, the first set of images may include consecutive images that begin and end with frames in which a human was not detected, and that include a human detected in one or more middle frames. For example, upon detecting the person in the image frame, the human detector 104 may send the image frame, multiple consecutive image frames captured by the camera 102 prior to the image frame, and multiple consecutive images frames captured by the camera 102 after the image frame, to the optical flow analyzer 110 for determining optical flow. The portions of the first set of images can be grid segments of a grid overlaid on the first set of images. For example, the grid may be formed of grid segments that are shaped as squares, rectangles, rhombuses, hexagons, triangles, pentagons, or other shapes. The grid segments may be adjacent to one another, and may be uniform in shape and size. Optical flow can include an average optical flow magnitude and an optical flow direction and coherence. For example, the optical flow magnitude may be five pixels per frame. The optical flow direction may be a direction of thirty degrees, and the optical flow coherence may be seventy percent of pixels moving in a same direction of thirty degrees.

In some implementations, the first set of images includes consecutive images captured by the camera, and the consecutive images include the image in which the person was detected. For example, the first set of images can be Camera Image Set 1, including consecutive images captured by the camera 102. Camera Image Set 1 includes the image in which the person 106 was detected. The first set of images, can include, e.g., ten consecutive images, fifteen consecutive images, twenty consecutive images, etc.

In some implementations, a first image of the consecutive images is the image in which the person was detected. For example, for a first set of images including fifteen consecutive images, the first image of the fifteen consecutive images can be the image in which the person 106 was detected by the human detector 104.

In some implementations, a final image of the consecutive images is the image in which the person was detected. For example, for a first set of images including fifteen consecutive images, the fifteenth image of the fifteen consecutive images can be the image in which the person 106 was detected by the human detector 104.

In some implementations, determining optical flow in portions of the first set of images includes comparing pixel values in corresponding portions of consecutive images. The portions of the first set of images can be grid segments 109 of the images in Camera Image Set 1. The optical flow analyzer 110 can determine optical flow in each grid segment 109. For example, the optical flow analyzer 110 can compare pixel values in the grid segment 114 in a first consecutive image of the first set of images to pixel values in the corresponding grid segment 114 in a second consecutive image of the first set of images. The optical flow analyzer 110 can determine optical flow in the grid segment 114 by comparing the pixel values in corresponding grid segment 114 across consecutive images of the first set of images.

The process 300 includes determining that the portions of the first set of images satisfy optical flow criteria (306). For example, the optical flow analyzer 110 can determine that certain portions of Camera Image Set 1 satisfy optical flow criteria. Optical flow criteria can include optical flow magnitude criteria and optical flow direction criteria. For example, the optical flow magnitude criteria can include a minimum average flow magnitude of three pixels per frame.

The optical flow direction criteria can include a minimum coherence of sixty percent of pixels moving in a same direction. The optical flow analyzer 110 may determine, for example, that portions of Camera Image Set 1 that correspond to a swinging edge of the door 115 satisfy the optical flow criteria.

In some implementations, the optical flow criteria include criteria for at least one of optical flow magnitude, optical flow direction, or optical flow coherence of the portions of the first set of images. Optical flow magnitude criteria can include a minimum threshold speed of motion flow of pixels in a grid segment across the first set of images. The minimum speed of motion flow of pixels can be, for example, three pixels per frame, four pixels per frame, or five pixels per frame.

Optical flow direction criteria can include a minimum threshold percentage of pixels of a grid segment moving in a same direction. In some examples, pixels can be classified as moving in the same direction if motion of the pixels is within the same direction bin, e.g., a thirty degree bin. The minimum threshold percentage of pixels of a grid segment moving in the same direction can be, for example, sixty-five percent of pixels moving in the same direction bin between ninety degrees and one hundred twenty degrees.

The process 300 includes in response to determining that the portions of the first set of images satisfy the optical flow criteria, classifying the portions of the first set of images as indicative of human activity (308). For example, the optical flow analyzer 110 can classify the portions of Camera Image Set 1 that correspond to the swinging edge of the door 115 as indicative of human activity and output optical flow grid 120 to the human activity detector 112. The optical flow grid 120 can designate the portions of Camera Image Set 1 that indicate human activity. For example, the black grid segments 117 represent portions classified as indicative of human activity and the white grid segments 119 represent portions classified as not indicative of human activity.

In some implementations, classifying the particular portions of the first set of images as indicative of human activity includes determining that the particular portions of the first set of images depict movement of an object that moves in co-occurrence with human motion. For example, the optical flow analyzer 110 can determine that black grid segments 117 meet optical flow criteria in Camera Image Set 1. Based on the black grid segments 117 meeting optical flow criteria, the optical flow analyzer 110 can determine that the black grid segments 117 depict movement of an object, e.g., the door 115, that moves in co-occurrence with human motion.

In some implementations, the process 300 includes generating a bounding box around the detected person. For example, the human detector 104 can generate a bounding box 124 around the detected person 106. Classifying the particular portions of the first set of images as indicative of human activity can include determining that the particular portions of the first set of images have less than a threshold overlap with the bounding box. For example, the optical flow analyzer 110 can classify the black grid segments 117 as indicative of human activity based at least in part on determining that each of the black grid segments 117 has less than a threshold overlap with the bounding box 124. The threshold overlap can be, for example, thirty percent of a grid segment overlapping with the bounding box 124, twenty percent of a grid segment overlapping with the bounding box 124, or ten percent of a grid segment overlapping with the bounding box 124.

In some implementations, the particular portions of the first set of images include segments of a grid overlaid on each image of the first set of images. For example, the particular portions of Camera Image Set 1 can include grid segments 109 of a grid overlay applied to Camera Image Set 1. The process 300 can include generating a gridded representation of the particular portions of the first set of images that are classified as indicative of human activity. For example, the optical flow analyzer 110 can generate human activity optical flow grid 120, representing the grid segments of Camera Image Set 1 that are classified as indicative of human activity.

In some implementations, the gridded representation includes binary representations indicating whether each portion of the first set of images is indicative of human activity. For example, the human activity optical flow grid 120 includes a binary representation including white grid segments 119 and black grid segments 117. The white grid segments 119 indicate grid segments that are not indicative of human activity. The black grid segments 117 indicate grid segments that are indicative of human activity.

In some implementations, the gridded representation includes gradient representations indicating a degree to which each portion of the first set of images is indicative of human activity. For example, a human activity optical flow grid can include a graded heat map. Each grid segment in the graded can be assigned a human activity score according to the correlation between optical flow motion in the grid segment and human activity. The human activity score can be, for example, a score between zero and one hundred. A human activity score of zero can indicate no correlation between motion in the grid segment and human activity. A human activity score of one hundred can indicate high correlation between motion in the grid segment and human activity.

In some implementations, classifying the particular portions of the first set of images as indicative of human activity includes determining that the particular portions of the first set of images correspond to a human trajectory through a scene captured by the camera. For example, classifying the grid segments of the first set of images as indicative of human activity can include generating a trajectory grid 220 that corresponds to a human trajectory through a scene including the walkway 218.

The process 300 includes receiving a second set of images captured by the camera after the first set of images (310). For example, the camera 102 can capture Camera Image Set 2 after capturing Camera Image Set 1. The human activity detector 112 can receive Camera Image Set 2. Camera Image Set 2 shows the door 115 swinging open, but does not show a person.

The process 300 includes determining that the second set of images likely shows human activity based on analyzing portions of the second set of images that correspond to the particular portions of the second set of images classified as indicative of human activity (312). For example, the human activity detector 112 can determine that Camera Image Set 2 shows optical flow in the black grid segments 117 in the optical flow grid 120. Specifically, Camera Image Set 2 shows optical flow in portions corresponding to the swinging door 115 and the black grid segments 117. Thus, though Camera Image Set 2 does not show a person, the human activity detector 112 can determine that Camera Image Set 2 likely shows human activity based on the optical flow corresponding to the swinging door 115.

In some implementations, determining that the second set of images likely shows human activity based on analyzing the portions of the second set of images that correspond to the particular portions of the first set of images classified as indicative of human activity includes detecting optical flow in the portions of the second set of images that correspond to the particular portions of the first set of images that are classified as indicative of human activity. For example, the second set of images can be Camera Image Set 2. The human activity detector 112 can analyze grid segments of Camera Image Set 2 that correspond to the black grid segments 117. Based on detecting optical flow in the grid segments of Camera Image Set 2 that correspond to the black grid segments 117, the human activity detector 112 can determine that Camera Image Set 2 likely shows human activity.

In some implementations, determining that the second set of images likely shows human activity based on analyzing the portions of the second set of images that correspond to the particular portions of the first set of images classified as indicative of human activity includes determining, based on detecting motion of the object that moves in co-occurrence with human motion, that the second set of images likely shows human activity. For example, the second set of images can be Camera Image Set 2. The human activity detector 112 may detect motion of the door 115 that moves in co-occurrence with human motion. Based on detecting motion of the door 115, the human activity detector 112 can determine that Camera Image Set 2 likely shows human activity.

In some implementations, determining that the second set of images likely shows human activity based on analyzing portions of the second set of images that correspond to the particular portions of the first set of images classified as indicative of human activity includes determining that a matching percentage between portions of the second set of images that exhibit optical flow and the particular portions of the first set of images exceeds a threshold matching percentage. For example, a threshold matching percentage may be seventy percent. The human activity detector 112 can identify grid segments of Camera Image Set 2 that exhibit optical flow and can determine a matching percentage between the grid segments of Camera Image Set 2 that exhibit optical flow and the human activity optical flow grid 120. The example human activity optical flow grid 120 includes seven black grid segments 117. The human activity detector 112 may determine that six out of seven corresponding grid segments of Camera Image Set 2 exhibit optical flow, and therefore that the matching percentage is eighty-six percent. Based on determining that the matching percentage of eighty-six percent exceeds the threshold matching percentage of seventy percent, the human activity detector 112 can determine that Camera Image Set 2 likely shows human activity.

In some implementations, determining that the second set of images likely shows human activity based on analyzing portions of the second set of images that correspond to the particular portions of the first set of images classified as indicative of human activity includes detecting motion along the human trajectory through the scene captured by the camera. For example, the human activity detector 112 can analyze portions of a second set of images that correspond to the black grid segments of trajectory grid 220. Based on detecting motion along the black grid segments of trajectory grid 220, the human activity detector 112 can determine that the second set of images likely shows human activity.

In some implementations, the process 300 includes, in response to determining that the second set of images likely shows human activity based on analyzing portions of the second set of images that correspond to the particular portions of the first set of images classified as indicative of human activity, generating a notification that indicates that human activity was likely detected. For example, the camera 102 may generate a notification and provide the notification to a resident of the property 105. In some examples, the human activity detector 112 may provide the classification to a server that provides a notification to a user device that indicates that human activity was likely detected. In another example, the human activity detector 112 may provide the classification to a control unit that adjusts one or more devices at the property 105. For example, the control unit may turn on a porch light at the property 105. In another example, the camera 102 may be incorporated into a device such as a doorbell camera that includes additional sensors, and the human activity detector 112 may trigger activation of one or more of the additional sensors. For example, the human activity detector 112 may trigger activation of a microphone that is incorporated into the doorbell camera.

In some implementations, the process 300 includes detecting a non-human object in a second image captured by the camera. For example, the camera 102 can detect a non-human object such as a vehicle in a second image. In response to detecting the non-human object in the second image captured by the camera, the system can determine optical flow in portions of a third set of images that are captured by the camera, where the third set of images includes the second image. For example, in response to detecting the vehicle, the system can determine optical flow in grid segments of a third set of images that includes the second image in which the vehicle was detected.

The process 300 can include determining that particular portions of the third set of images satisfy optical flow criteria. For example, the system can determine that grid segments corresponding to the street 215 satisfy optical flow criteria. In response to determining that the particular portions of the third set of images satisfy optical flow criteria, the process 300 can include classifying the particular portions of the third set of images as indicative of non-human object motion. For example, in response to determining that the grid segments corresponding to the street 215 satisfy optical flow criteria, the system can classify the grid segments corresponding to the street 215 as indicative of non-human object motion. The system can generate an optical flow trajectory grid 240 representing the grid segments that are indicative of non-human object motion.

The process 300 can include receiving a fourth set of images captured by the camera after the third set of images and determining that the fourth set of images likely shows non-human object motion based on analyzing portions of the fourth set of images that correspond to the particular portions of the third set of images classified as indicative of non-human object motion. For example, the system can receive a fourth set of images that shows a second vehicle driving along the street 215. The system can analyze the grid segments of the fourth set of images that correspond to the black grid segments of the trajectory grid 240. Based on detecting optical flow motion in the grid segments corresponding to the black grid segments of the trajectory grid 240, the system can determine that the fourth set of images likely shows non-human object motion.

Figure 4:
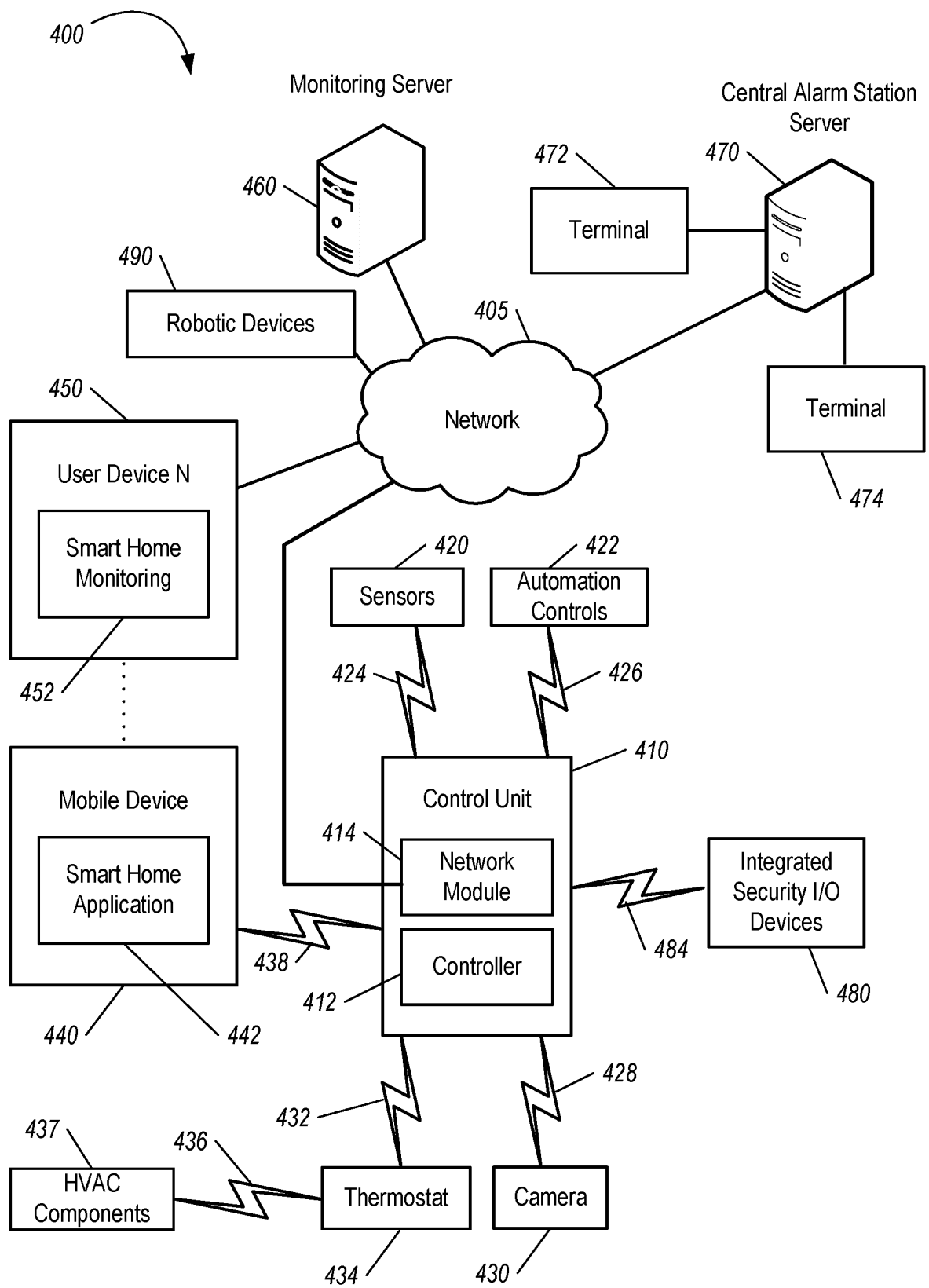
FIG. 4 is a diagram illustrating an example of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a camera, lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state," or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400. For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method, comprising:

detecting a person depicted in an image captured by a camera;

in response to detecting the person depicted in the image captured by the camera, determining optical flow in pixel groups of a first set of images that are captured by the camera;

determining that particular pixel groups of the first set of images satisfy optical flow criteria that i) indicate flow motion characteristics of human activity and ii) include criteria for at least one of optical flow magnitude or optical flow direction of the pixel groups of the first set of images, each of the particular pixel groups having the same location in each image of the first set of images;

in response to determining that the particular pixel groups of the first set of images satisfy the optical flow criteria, classifying the particular pixel groups of the first set of images as indicative of human activity;

receiving a second set of images captured by the camera after the first set of images;

analyzing second pixel groups of the second set of images that correspond to the locations of the particular pixel groups of the first set of images classified as indicative of human activity; and determining that the second set of images likely shows human activity using a result of the analysis of the second pixel groups of the second set of images that correspond to the locations of the particular pixel groups of the first set of images classified as indicative of human activity.

2. The method of claim 1, wherein determining that the second set of images likely shows human activity based on analyzing the pixel groups of the second set of images that correspond to the particular pixel groups of the first set of images classified as indicative of human activity comprises detecting optical flow in the pixel groups of the second set of images that correspond to the particular pixel groups of the first set of images that are classified as indicative of human activity.

3. The method of claim 1, wherein classifying the particular pixel groups of the first set of images as indicative of human activity comprises determining that the particular pixel groups of the first set of images depict movement of an object that moves in co-occurrence with human motion.

4. The method of claim 3, wherein determining that the second set of images likely shows human activity based on analyzing the pixel groups of the second set of images that correspond to the particular pixel groups of the first set of images classified as indicative of human activity comprises determining, based on detecting motion of the object that moves in co-occurrence with human motion, that the second set of images likely shows human activity.

5. The method of claim 1, wherein classifying the particular pixel groups of the first set of images as indicative of human activity comprises determining that the particular pixel groups of the first set of images correspond to a human trajectory through a scene captured by the camera.

6. The method of claim 5, wherein determining that the second set of images likely shows human activity based on analyzing portions of the second set of images that correspond to the particular pixel groups of the first set of images classified as indicative of human activity comprises detecting motion along the human trajectory through the scene captured by the camera.

7. The method of claim 1, wherein determining that the second set of images likely shows human activity based on analyzing portions of the second set of images that correspond to the particular pixel groups of the first set of images classified as indicative of human activity comprises determining that a matching percentage between portions of the second set of images that exhibit optical flow and the particular pixel groups of the first set of images exceeds a threshold matching percentage.

8. The method of claim 1, comprising generating a bounding box around the detected person, wherein classifying the particular pixel groups of the first set of images as indicative of human activity comprises:

determining that the particular pixel groups of the first set of images have less than a threshold overlap with the bounding box.

9. The method of claim 1, wherein the particular pixel groups of the first set of images comprise segments of a grid overlaid on each image of the first set of images, the method comprising generating a gridded representation of the particular pixel groups of the first set of images that are classified as indicative of human activity.

10. The method of claim 9, wherein the gridded representation includes binary representations indicating whether each portion of the first set of images is indicative of human activity.

11. The method of claim 9, wherein the gridded representation includes gradient representations indicating a degree to which each portion of the first set of images is indicative of human activity.

12. The method of claim 1, wherein the first set of images includes consecutive images captured by the camera, the consecutive images including the image in which the person was detected.

13. The method of claim 12, wherein a first image of the consecutive images is the image in which the person was detected.

14. The method of claim 12, wherein a final image of the consecutive images is the image in which the person was detected.

15. The method of claim 1, wherein determining optical flow in portions of the first set of images comprises comparing pixel values in corresponding portions of consecutive images.

16. The method of claim 1, comprising:
in response to determining that the second set of images likely shows human activity based on analyzing portions of the second set of images that correspond to the particular pixel groups of the first set of images classified as indicative of human activity, generating a notification that indicates that human activity was likely detected.

17. The method of claim 1, comprising:
detecting a non-human object in a second image captured by the camera;
in response to detecting the non-human object in the second image captured by the camera, determining optical flow in portions of a third set of images that are captured by the camera, wherein the third set of images includes the second image;
determining that particular pixel groups of the third set of images satisfy optical flow criteria;
in response to determining that the particular pixel groups of the third set of images satisfy optical flow criteria, classifying the particular pixel groups of the third set of images as indicative of non-human object motion;
receiving a fourth set of images captured by the camera after the third set of images; and
determining that the fourth set of images likely shows non-human object motion based on analyzing portions of the fourth set of images that correspond to the particular pixel groups of the third set of images classified as indicative of non-human object motion.

18. A monitoring system for monitoring a property, the monitoring system comprising one or more computers configured to perform operations comprising:
detecting a person depicted in an image captured by a camera;
in response to detecting the person depicted in the image captured by the camera, determining optical flow in pixel groups of a first set of images that are captured by the camera;
determining that particular pixel groups of the first set of images satisfy optical flow criteria that i) indicate flow motion characteristics of human activity and ii) include criteria for at least one of optical flow magnitude or optical flow direction of the pixel groups of the first set of images, each of the particular pixel groups having the same location in each image of the first set of images;
in response to determining that the particular pixel groups of the first set of images satisfy the optical flow criteria, classifying the particular pixel groups of the first set of images as indicative of human activity;
receiving a second set of images captured by the camera after the first set of images;
analyzing second pixel groups of the second set of images that correspond to the locations of the particular pixel groups of the first set of images classified as indicative of human activity; and
determining that the second set of images likely shows human activity using a result of the analysis of the second pixel groups of the second set of images that correspond to the locations of the particular pixel groups of the first set of images classified as indicative of human activity.

19. A non-transitory computer-readable medium storing software comprising instructions executable by one or more computers which, upon such execution, cause the one or more computers to perform operations comprising:
detecting a person depicted in an image captured by a camera;
in response to detecting the person depicted in the image captured by the camera, determining optical flow in pixel groups of a first set of images that are captured by the camera;
determining that particular pixel groups of the first set of images satisfy optical flow criteria that i) indicate flow motion characteristics of human activity and ii) include criteria for at least one of optical flow magnitude or optical flow direction of the pixel groups of the first set of images, each of the particular pixel groups having the same location in each image of the first set of images;
in response to determining that the particular pixel groups of the first set of images satisfy the optical flow criteria, classifying the particular pixel groups of the first set of images as indicative of human activity;
receiving a second set of images captured by the camera after the first set of images;
analyzing second pixel groups of the second set of images that correspond to the locations of the particular pixel groups of the first set of images classified as indicative of human activity; and
determining that the second set of images likely shows human activity using a result of the analysis of the second pixel groups of the second set of images that correspond to the locations of the particular pixel groups of the first set of images classified as indicative of human activity.

* * * * *

UNITED STATES PATENT AND TRADEMARK OFFICE
CERTIFICATE OF CORRECTION

PATENT NO. : 11,580,833 B2  
APPLICATION NO. : 17/202528  
DATED : February 14, 2023  
INVENTOR(S) : Narayanan Ramanathan et al.

Page 1 of 1

It is certified that error appears in the above-identified patent and that said Letters Patent is hereby corrected as shown below:

On the Title Page

Column 1, item (73) Assignee, delete "Object Video Labs, LLC," and insert -- ObjectVideo Labs, LLC, --.

Signed and Sealed this  
Fourth Day of April, 2023

Katherine Kelly Vidal  
*Director of the United States Patent and Trademark Office*